Dec. 11, 1951     F. D. GREENLEAF ET AL     2,577,848
PROTECTIVE CIRCUIT
Filed Feb. 16, 1950
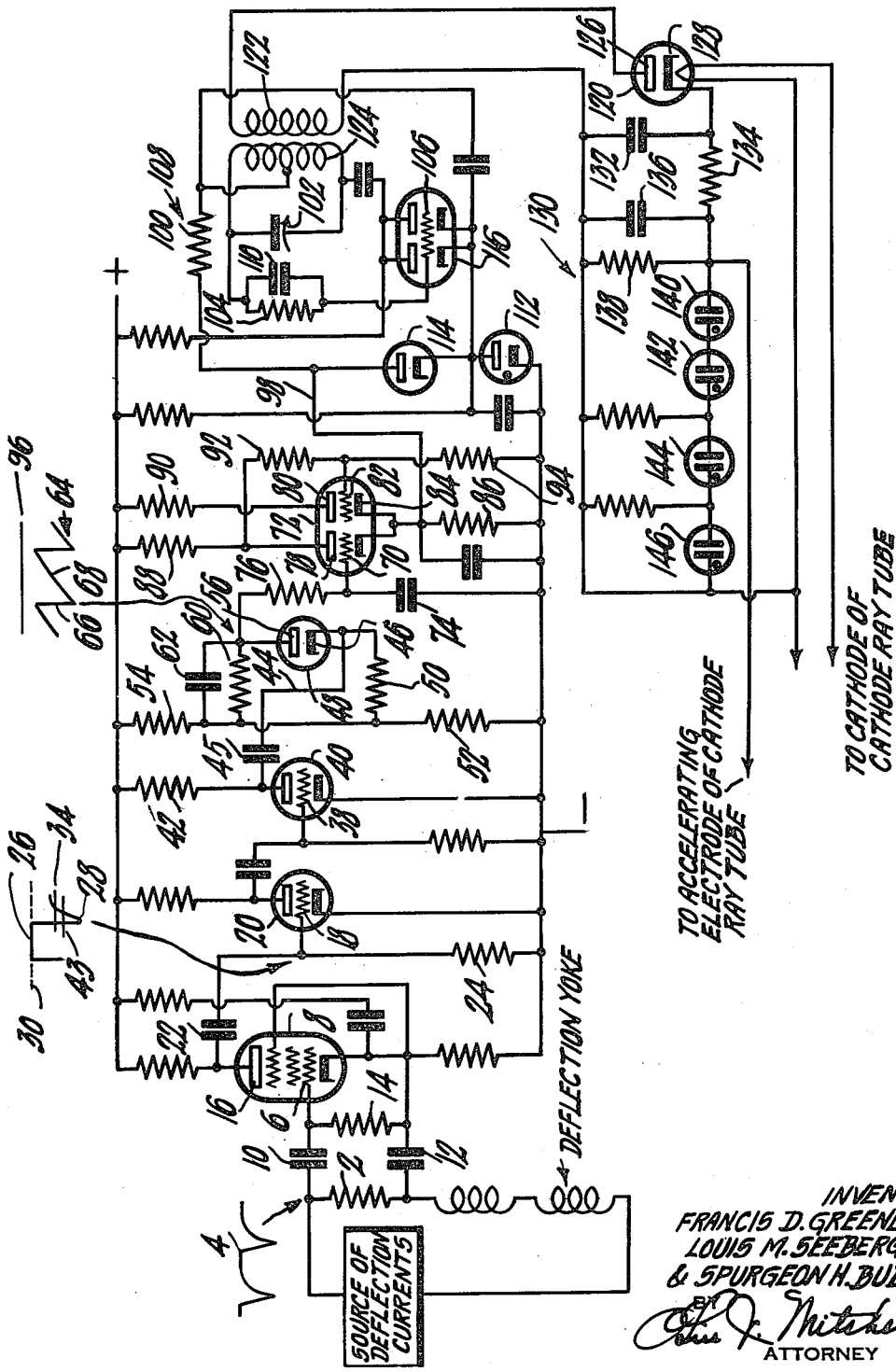
INVENTORS
FRANCIS D. GREENLEAF,
LOUIS M. SEEBERGER
& SPURGEON H. BUDER
ATTORNEY Patented Dec. 11, 1951

2,577,848

UNITED STATES PATENT OFFICE 2,577,848

PROTECTIVE CIRCUIT

Francis D. Greenleaf, Oaklyn, Louis M. Seeberger, Woodbury, and Spurgeon H. Buder, Merchantville, N. J., assignors to Radio Corporation of America, a corporation of Delaware Application February 16, 1950, Serial No. 144,544

7 Claims. (Cl. 315—20)

This invention relates to the protection of the target or screen structure of a cathode ray tube in the event of sweep failure.

Previous protection circuits have been designed to operate in combination with cathode ray tubes in which the cathode is at or near ground potential and the screen or target is at a relatively high positive potential. When, however, these circuits are employed in combination with a cathode ray tube in which the screen or target is at or near ground potential and the cathode is at a relatively high negative potential, certain difficulties arise. For example, the protection circuit itself is at a highly negative potential so as to necessitate greater insulation and introduce a safety hazard.

Furthermore, previously suggested circuits permit ripple that is generally present in the deflection voltages applied to their input terminals to modulate the intensity of the beam of electrons. In some cathode ray tubes such as graphecons, even a slight amount of extraneous beam modulation is disastrous because of their great sensitivity. Of course, filters having long time constants can be employed to reduce the amount of ripple, but this necessarily slows down the speed with which the protection circuit can act to such an extent as to make it useless in certain applications.

The current flowing in the deflection coil circuit develops a voltage which is differentiated, double clipped and stored. This stored voltage is used to maintain a flip-flop circuit in one state. When the voltage fails the flip-flop circuit changes to the other state of equilibrium and biases off the high voltage power supply.

In general, there have been two different types of circuits employed for protection of the cathode ray tubes in the event of sweep failure. In a first type, a voltage is derived from the sweep circuits and applied to an electrode or circuit associated with the operation of the tube. In a second type, a voltage is derived independently of the sweep circuits and is applied to an electrode or circuits associated with the operation of the tube under the control of voltages derived from the sweep circuits. In both types, the electrode or circuit associated with the cathode ray tube to which these variously derived voltages are applied operates upon the failure of such voltage to disable the beam, thus preventing damage to the tube. This may be done by defocusing or reducing the number of electrons in the beam.

The first type of protective circuit may be useful in applications where either a great deal of ripple and fast action or a small amount of ripple and slow action can be tolerated. As pointed out above, this invention is directed towards applications, such as in a graphecon, where both fast action and freedom from ripple are required. This invention may be said to belong to the second of the two types of protective circuits mentioned above.

In accordance with one aspect of this invention, the control of the voltage applied to the electrode or circuit which disables the beam of the cathode ray tube on sweep failure is effected in such a way that little or no ripple is present.

Another object of this invention is to provide an improved protection circuit for cathode ray tubes having a cathode that is at a negative potential with respect to ground in which a minimum portion of the protection circuit is below ground potential.

Another object of the invention is to provide an improved high speed protection circuit for cathode ray tubes having a cathode at a negative potential with respect to ground in which no ripple of sweep frequency is introdced into the intensity modulation of the cathode ray beam.

These and other objects will become apparent upon detailed consideration of the drawing in which there is shown a schematic arrangement of a protective circuit embodying the principles of this invention.

Before proceeding with the details of the schematic circuit shown in the drawing, the following brief explanation of the overall operation is given. A voltage waveform having the shape of the current in the deflection coils of the cathode ray tube is derived from the deflection circuit and is differentiated so as to generate a large negative pulse of short duration with respect to the sweep cycle. This negative pulse is doubly clipped, the slice of the pulse between the clipping levels being employed to charge an energy storage circuit. The output of the energy storage circuit is employed to maintain a flip-flop multivibrator which may be of the Eccles Jordan type on one of its states of operation. The flip-flop circuit is connected in such manner that when the deflection circuits fail the flip-flop circuit reverts to its other state. The output of the flip-flop circuit is applied to control an oscillator in such a way that when it is in its other state, the output of the oscillator is reduced to zero. Since the output of the oscillator is rectified so as to provide an accelerating potential to one of the electrodes of the cathode ray tube, the drop in its output voltage serves to reduce the accelerating potential applied to this electrode and therefore intensity of the beam in the cathode ray tube is reduced.

The drawing shows a circuit arrangement that is adapted to protect the screen or target of a cathode ray tube in the event of failure in the sweep circuits in accordance with the principles of this invention. Resistor 2 is inserted in series with the deflection coils so that a voltage having a sawtooth waveform such as indicated by numeral 4 is developed across it only when the deflection coils are operating to deflect the beam. Voltage waveform 4 is applied in a negative-going sense to the grid 6 of the amplifier 8 via condensers 10 and 12 and grid leak resistor 14. Waveform 4 therefore appears at the plate 16 of amplifier 8 in inverted form and is coupled to the grid 18 of amplifier 20 via condenser 22 and resistor 24. The values of the condenser 22 and resistor 24 are chosen in accordance with the principles well known to those skilled in the art so that they differentiate the inverted waveform 4 that appears at the plate 16 of the amplifier 8. In this way, the negative-going portion of the waveform is accentuated so that the waveform 26 is applied to the grid 18. It will be noted that the negative peaks 28 of this waveform are of short duration with respect to the sweep cycle. Because waveform 26 is coupled to the grid 18 via condenser 22, and because tube 20 is operated without cathode bias, waveform 26 will be clamped to zero volts at the axis shown by dotted line 30. The amplitude of waveform 26 is sufficient so that plate current cut off for tube 20 occurs at axis 34 of waveform 26. In this way, variations in the amplitude of the waveform 26 will not pass through amplifier 20 and the reason for this will become apparent as the description proceeds.

After being limited and having its phase inverted in amplifier 20, waveform 26 is applied to the grid 38 of amplifier 40. Again clamping of the clipped waveform 26 occurs at grid 38 because of the absence of cathode bias in tube 40 and the amplitude is such that clipping of waveform 26 occurs at axis 43. The double clipping action thus performed insures that the pulses supplied by the amplifier 40 via condenser 43 over lead 44 have a uniform amplitude regardless of variations in amplitude of waveform 26.

Lead 44 is connected to the cathode 46 of unilateral conducting device 48 and is returned to ground potential via resistors 50 and 52, the resistor 50 being considerably larger than resistor 52. The resistor 52 is connected in series with the resistor 54 and this series combination is connected between ground and a source of fixed positive potential so that the cathode 46 of the unilateral conducting device 48 is maintained at positive fixed potential with respect to ground in the absence of any signal on lead 44.

The plate 56 of the unilateral conducting device 48 is connected to the junction of resistor 52 and 54 via resistor 60 and condenser 62 connected in parallel. On the absence of any signals on lead 44 therefore, plate 56 will have the same positive potential as the cathode 46 and no current flows through the unilateral device 48.

Upon the appearance of the negative pulse occurring between leads 43 and 34 of waveform 26 on lead 44, the cathode 46 becomes negative with respect to plate 56 because most of the potential drop appears across resistor 50. The unilateral conducting device 48 then charges condenser 62 so that the right hand side thereof as shown becomes negative during normal operations, that is, when the negative pulses 28 of waveform 26 appear at uniformly spaced intervals. The values of the above circuit components are such that cathode 46 is maintained at an average positive potential with respect to the plate 56 of the unilateral conducting device 48. However, during the negative pulses appearing on lead 44 the cathode 46 becomes negative with respect to the plate so as to permit the unilateral conducting device to pass current. At the same time, the plate 56 of the unilateral conducting device 48 is driven in a positive direction by the discharge of condenser 62 through resistor 60. If the time constant of the condenser 45 and resistor 50 is sufficiently large with respect to a sweep cycle, then the unilateral conducting device 48 will be cut off during the interval between the negative pulses 28 of waveform 26. During this interval, the voltage appearing at the plate 56 of the unilateral conducting device 48 is determined by the time constant of condenser 62 and resistor 60 alone.

The voltage waveform appearing at plate 56 is generally indicated by the numeral 64, the sharply sloped edge 66 occurring during the negative pulse 28 of waveform 26 and the more slowly sloping side 68 occurring during the discharge of condenser 62 through resistor 60. The waveform 64 is coupled to the grid 70 of tube 72 via condenser 74 and resistor 76, the values of which are so chosen that their time constant is short in comparison with a sweep cycle. Therefore, the waveform appearing at grid 70 follows closely that appearing at plate 56. Tube 72 must be comprised of a dual triode with heaters in series or with a common cathode, plate 78 being associated with grid 70, and plate 80 being associated with grid 82. Cathode 84 is common to both triode sections and is connected to ground by a suitably by-passed resistor 86. The plate 78 is connected to a source of fixed potential via plate load resistor 88 and plate 80 in the right hand half of the tube 72 is connected to the same fixed potential via a load resistor 90 which is small in comparison with load resistor 88. The plate 78 of the left hand half of tube 72 is conected via voltage dropping resistors 92 and 94 to the grid 82 of the right hand half of the tube 72 so as to bias it more positively than the grid 70 of the left hand half of the tube 72. In this way, the right hand half of the tube 72 remains in a conducting condition and the current drawn through the cathode resistor 86 is sufficiently positive to aid in cutting off the left hand half of the tube 72.

As long as the sweeping operation is performed in normal fashion, the negative potential created by the discharge of condenser 62 maintains grid 70 at sufficiently negative potential to keep the left hand half of tube 72 cut off. The time constant of the RC combination of condenser 62 and 60 is suitably chosen so that this condition persists for at least, but not much more than, the remainder of the cycle following the negative pulses 28 of waveform 26. As an illustration, line 96 in waveform 64 indicates the potential above which grid 70 will reverse the conducting conditions of the tube 72 so that the left hand half of the tube becomes conductive and the right hand half of the tube is cut off.

The common cathode 84 of the tube 72 is coupled by lead 98 via current limiting resistor 100, tank circuit 102 and resistor 104 to the grid 106 of an oscillator generally indicated by the numeral 108. This oscillator may be of any standard type, and it is self-biased by condenser 110 in parallel with the resistor 104. A voltage regulator tube 112 and a diode 114 are connected in series between B— and lead 98 so as to be in parallel with the cathode resistor 86 of tube 72. The cathode 116 of the oscillator is connected to the junction between voltage regulator tube 112 and diode 114. In this way, the bias between the grid 106 and the cathode 116 of the oscillator 108 is not affected by the voltage appearing across resistor 86 of flip-flop 72 as long as that voltage is greater than that appearing across tube 112. Any positive pulses appearing across cathode resistor 86 will be in effect short-circuited to the potential established by the voltage regulator 112 by the presence of the diode 114. Though voltage regulator tube 112 is not essential to the operation of this invention, it helps to stabilize the oscillator 108.

The output of the oscillator 108 is coupled to a rectifier 120 by the inductive coupling between coil 122 and coil 124 that is in the tank circuit of the oscillator. The plate 126 of the rectifier 120 is connected to one end of coil 122 and the cathode 128 of rectifier 120 is connected to the other end of coil 122 via a suitable load circuit generally indicated by the numeral 130. The load circuit 130 may be made in any way known to those skilled in the art, but in this illustrative example, it is comprised of a condenser 132 connected between the cathode 128 of rectifier 120 and the other end of coil 122, a resistor 134 and condenser 136 connected in series parallel relationship with condenser 132, and a resistor 138 connected in parallel with condenser 136.

A series of neon tubes 140, 142, 144 and 146 are connected in parallel with resistor 138 and condenser 136. The lower terminal of neon tube 146 or the other side of coil 122 is connected to the highly negative cathode of the cathode ray tube. In the arrangement shown, the heater for the cathode of the cathode ray tube is connected in parallel with the heater for rectifier 120 and the cathode of the cathode ray tube is connected to its heater. In this way, the potential at the junction of resistor 134, condenser 136, resistor 138 and neon tube 140 will be maintained at a constant fixed potential above the highly negative potential of the cathode ray tube. Therefore, when this junction is connected to an accelerating electrode of a cathode ray tube, an electron beam is permitted to exert.

The time constant of the load circuit 130 of rectifier 120 need only be long in comparison with a half cycle of the frequency of oscillator 108 in order to prevent any ripple from appearing on the accelerating electrode on the cathode ray tube. As the frequency of the oscillator 108 can be made extremely high, this means that the time constant of the load circuit 130 of rectifier 120 can be made extremely short in comparison with the sweep cycle of the beam deflection system associated with the cathode ray tube. The advantage derived from this is that when failure of the deflection circuits is indicated by a drastic drop in the output of oscillator 108, the voltage applied to the accelerating electrode of the cathode ray tube can drop with great speed and therefore cut off the beam before any damage can be done to the screen or the target of the cathode ray tube.

Having described our invention, what we claim is:

1. A protection circuit for cathode ray tubes comprising in combination a deflection circuit adapted to operate at a cyclic rate, means for developing a direct voltage pulse once during each cycle of operation of said deflection circuit, a trigger circuit, a coupling network for connecting said means for developing pulses to said trigger circuit in such manner that the pulses tend to maintain said trigger circuit in one state, the time constant of said coupling network being such that said trigger circuit is maintained in one state for at least the remainder of one cycle of operation of said deflection circuit, a free-running oscillator, a coupling circuit connected between said oscillator and said trigger circuit in such manner that oscillations are interrupted when the trigger circuit is in its other state, and a rectifier for deriving a direct current potential in response to the output of said oscillator.

2. A protection circuit such as described in claim 1 in which said trigger circuit is comprised of at least a first and a second electron discharge device, the first being cut off and the second conducting when the trigger circuit is in one of its states, said coupling network being connected so that said pulses are applied in a negative-going sense to said first electron discharge device, thus tending to prevent any deflection voltage from modulating said oscillator during normal operation.

3. A circuit for protecting cathode ray tubes in the event of sweep failure comprising in combination a sweep circuit adapted to operate at a predetermined cyclic rate, means for developing a pulse having a short duration in comparison to a cycle of said sweep circuit, a trigger circuit having an output terminal that is at a given fixed potential when said trigger circuit is in one state and at a relatively negative fixed potential when said trigger circuit is in the other state, a coupling network for applying said pulses to said trigger circuit in such manner as to maintain it in the other state, the time constant of said coupling circuit being such that the trigger circuit is maintained in one state for at least the remainder of one cycle following each pulse, a free running oscillator comprising an electron discharge device, a control electrode associated with said discharge device, said control electrode being connected to said terminal, and a rectifier adapted to produce a fixed potential in response to the oscillations provided by said oscillator.

4. A device such as described in claim 1 in which said coupling circuit comprises a diode and a voltage regulator tube connected in series.

5. A protective device such as described in claim 2 in which said first and second electron discharge devices have a common cathode.

6. A protective device in accordance with claim 2 and wherein said first and second electrode discharge devices each have a filament and wherein said filaments are electrically connected in series.

7. A protective device such as described in claim 1 in which said coupling circuit includes a clamping circuit of such polarity that positive pulses are prevented from reaching the oscillator.

FRANCIS D. GREENLEAF.
LOUIS M. SEEBERGER.
SPURGEON H. BUDER.

REFERENCES CITED

The following references are of record in the file of this patent:

UNITED STATES PATENTS

| Number | Name | Date |
| --- | --- | --- |
| 2,098,384 | Goodrich | Nov. 9, 1937 |
| 2,180,153 | Kuehni | Nov. 14, 1939 |
| 2,222,426 | White et al. | Nov. 19, 1940 |
| 2,227,603 | Poch | Jan. 7, 1941 |
| 2,258,370 | Taylor et al. | Oct. 7, 1941 |
| 2,261,645 | Delvaux | Nov. 4, 1941 |
| 2,261,776 | Poch | Nov. 4, 1941 |
| 2,280,670 | Spielman | Apr. 21, 1942 |
| 2,297,547 | Foster et al. | Sept. 29, 1942 |
| 2,425,491 | Schlesinger | Aug. 12, 1947 |
| 2,444,902 | Torsch | July 6, 1948 |
| 2,476,167 | Wendt | July 12, 1949 |
| 2,492,674 | Wynn | Dec. 27, 1949 |
| 2,514,079 | Lockhart | July 4, 1950 |